W. D. WYGAL.
POULTRY DRINKING FOUNTAIN.
APPLICATION FILED FEB. 10, 1917.
1,299,091.
Patented Apr. 1, 1919.
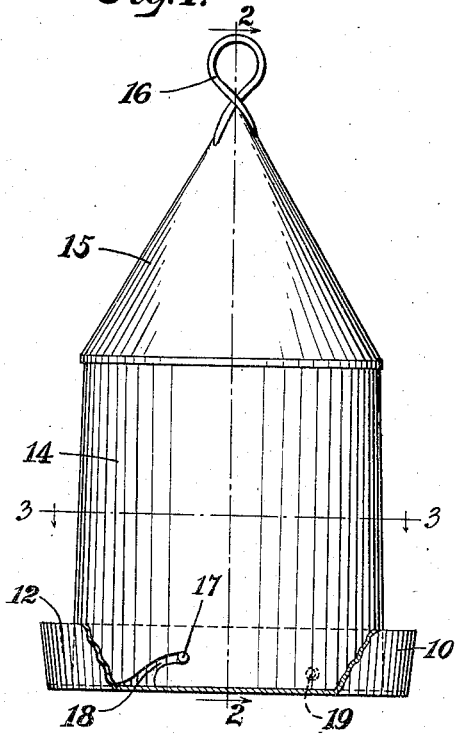
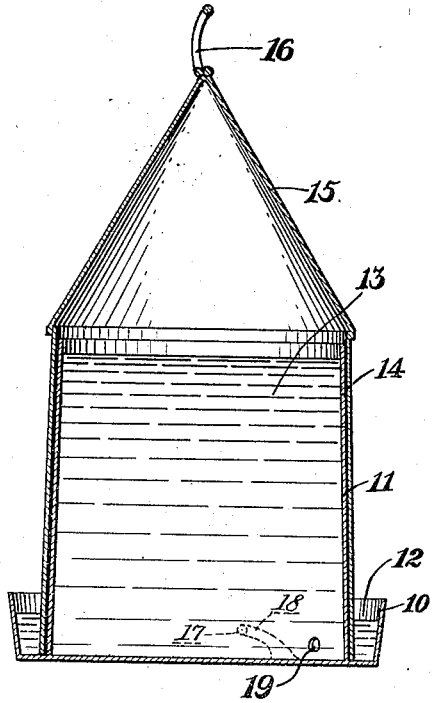
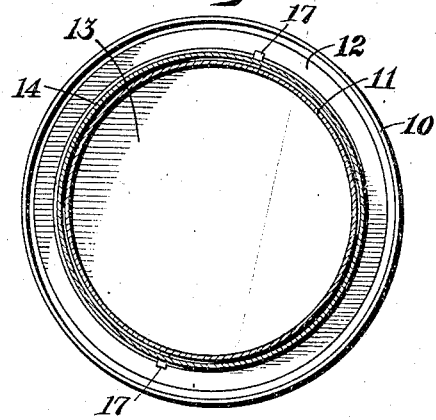
Inventor
William D. Wygal
by Hazard & Miller
Att'ys.

UNITED STATES PATENT OFFICE.

WILLIAM D. WYGAL, OF EL SEGUNDO, CALIFORNIA.

POULTRY DRINKING-FOUNTAIN.

1,299,091. Specification of Letters Patent. Patented Apr. 1, 1919.

Application filed February 10, 1917. Serial No. 147,953.

*To all whom it may concern:*

Be it known that I, WILLIAM D. WYGAL, a citizen of the United States, residing at El Segundo, in the county of Los Angeles and State of California, have invented new and useful Improvements in Poultry Drinking-Fountains, of which the following is a specification.

My object is to improve and simplify the details of construction of a poultry drinking fountain, and my invention consists in the novel features herein shown, described and claimed.

Figure 1 is a view in side elevation of the device and is shown with parts broken away to disclose the cover clamp construction.

Fig. 2 is a view in vertical section as seen on the line 2—2 of Fig. 1 and illustrates the manner in which the reservoir is covered and the troughs supplied with water.

Fig. 3 is a view in horizontal section as seen on the line 3—3 of Fig. 1 and illustrates the general arrangement of the component parts of the device.

Referring more particularly to the drawings, 10 indicates a shallow circular dish which is provided as a drinking trough and a base for the fountain. Formed upon said base and extending upwardly therefrom is a frusto-conical reservoir wall 11 which is concentrically disposed in relation to the base and provides an annular drinking trough 12. The wall 11 forms a reservoir 13 which is of a slightly reduced diameter at its upper end and is inclosed by a cover 14. This cover is formed with a frusto-conical body wall adapted to completely surround the reservoir wall 11 and to terminate at a point adjacent the bottom of dish 10. The upper end of the cover is formed with a conical top 15 which is provided with a handle 16 by which the entire fountain may be lifted.

The cover 14 is detachably secured over the reservoir by means of diametrically opposite pins 17 which are secured to the wall 11 and are engaged by bayonet slots 18. In this manner the cover may be readily removed and replaced and will also regulate the water level within the trough as will now be described. A water outlet 19 is formed through wall 11 of the reservoir at a point adjacent the lower end and will permit water to flow out between said wall and the cover in a manner to permit the trough to be filled. The water in the trough 12 will rise until the bayonet slots 18 are covered and then the flow of water will be discontinued until the level of the water in the trough is lowered, as by evaporation or use. The bayonet slots 18 form vents for the escape of air in applying the cover and prevent the air from blowing the water out of the trough. When the reservoir 13 and the trough 12 are empty of water the cover 14 is removed and water is poured into the reservoir 13 from a pail or other suitable device until the reservoir is filled to the desired extent and then the cover 14 is placed in position and pressed downwardly until the lower edge of the cover rides upon the bottom of the trough, care being taken to turn the cover until the pins 17 will find the entrances to the slots 18. During this operation, which requires only about a minute, very little water will pass through the opening 19 into the trough. It should be remembered that reservoir 11 and the cover 14 fitting thereover are frusto-conical in shape, and that as the cover 14 is placed over the top of the reservoir 11 the lower end of the cover 14 will not fit the top of the reservoir 11, but be spaced therefrom, thus preventing any air from being trapped as the cover is moved downwardly in position. Such trapping of air would be objectionable for the reason that it would force the water through the outlet 19 as the cover is put in place. The cover does not fit tightly the outer wall of the reservoir 11 until it rests against the bottom of the dish 10, as clearly shown in Fig. 2. Such trapping of air would occur if the reservoir 11 and the cover 14 fitting thereover had been made cylindrical instead of frusto-conical.

When the cover 14 has reached the end of its downward movement it is rotated to bring the pins 17 into the ends of the slots, thereby holding the reservoir securely to the cover. The water within the reservoir will pass outwardly through the opening 19 until the level of the water in the trough rises to the tops of the bayonet slots and as the level of the water within the trough lowers, air will pass in through the bayonet slots to the top of the cover and allow water within the reservoir to pass downwardly through the slot 19 into the trough until the seal is again established.

I claim:

1. A drinking fountain for poultry, comprising a frusto-conical water reservoir having an open upper end and a closed lower end and a water outlet near its lower end, a trough encircling said reservoir in position to receive water from said outlet, pins diametrically located and extending outwardly from the reservoir a short distance above the bottom of the trough, and a closed cover having a frusto-conical lower portion adapted to fit around and over the reservoir with its lower edge upon the bottom of the trough; there being bayonet slots extending upwardly and laterally from the lower edge of the cover and forming air vents for the cover and the pins extending from the reservoir fitting in said bayonet slots to hold the reservoir to the cover.

2. A drinking fountain for poultry comprising, a frusto-conical water reservoir having an open upper end and a closed lower end and a water outlet near its lower end, a trough encircling said reservoir in position to receive water from said outlet, a closed cover having a frusto-conical lower portion adapted to fit around and over the reservoir with its lower edge upon the bottom of the trough, and means for removably fastening said cover to said reservoir, said means comprising a slot in said cover, said slot forming air vents for air to travel between the cover and the reservoir as the water flows through the outlet into the trough.

In testimony whereof I have signed my name to this specification.

WILLIAM D. WYGAL.

Copies of this patent may be obtained for five cents each, by addressing the "Commissioner of Patents, Washington, D. C."